(12) United States Patent
Baines et al.

(10) Patent No.: US 10,689,091 B2
(45) Date of Patent: Jun. 23, 2020

(54) TILTROTOR AIRCRAFT WINGS HAVING BUCKLE ZONES

(71) Applicant: Textron Innovations Inc., Providence, RI (US)

(72) Inventors: Andrew G. Baines, Fort Worth, TX (US); James Everett Kooiman, Fort Worth, TX (US); George Ryan Decker, Fort Worth, TX (US); John Richard McCullough, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 499 days.

(21) Appl. No.: 15/667,499

(22) Filed: Aug. 2, 2017

(65) Prior Publication Data
US 2019/0039718 A1   Feb. 7, 2019

(51) Int. Cl.
| B64C 3/26 | (2006.01) |
| B64C 3/18 | (2006.01) |
| B64C 3/34 | (2006.01) |
| B64C 29/00 | (2006.01) |

(52) U.S. Cl.
CPC .................. B64C 3/26 (2013.01); B64C 3/18 (2013.01); B64C 3/187 (2013.01); B64C 3/34 (2013.01); B64C 29/0033 (2013.01)

(58) Field of Classification Search
CPC ......... B64C 3/26; B64C 3/18; B64C 29/0033; B64C 3/34; B64C 3/187
See application file for complete search history.

(56) References Cited

U.S. PATENT DOCUMENTS

| 4,671,470 A * | 6/1987 | Jonas ................. B29C 66/4326 244/119 |
| 9,663,225 B1 * | 5/2017 | Kooiman ............ B64C 29/0033 |
| 2003/0146346 A1 * | 8/2003 | Chapman, Jr. ............ B64F 5/10 244/123.3 |
| 2006/0051592 A1 * | 3/2006 | Rawlings ............... B64D 45/02 428/423.1 |

(Continued)

FOREIGN PATENT DOCUMENTS

| EP | 2759470 A2 * | 7/2014 | ............... B64C 1/26 |
| EP | 2759470 A3 | 12/2017 | |
| WO | WO-2008139214 A1 * | 11/2008 | ............... B64C 3/48 |

OTHER PUBLICATIONS

European Exam Report; Application No. EP 17193602.4; European Patent Office; dated May 25, 2018.

(Continued)

*Primary Examiner* — Assres H Woldemaryam
(74) *Attorney, Agent, or Firm* — Lawrence Youst PLLC (57) ABSTRACT

A wing airframe for a wing of a tiltrotor aircraft includes a wing airframe core assembly and a wing skin assembly disposed on the wing airframe core assembly. The wing skin assembly includes a lower wing skin assembly disposed on the bottom side of the wing airframe core assembly. The tiltrotor aircraft includes a fuselage underneath the wing. The lower wing skin assembly has one or more buckle zones outboard of the fuselage. The buckle zones are locally susceptible to buckling in response to an impact of the tiltrotor aircraft, thereby protecting the fuselage from being crushed by the wing.

18 Claims, 7 Drawing Sheets

(56) References Cited

U.S. PATENT DOCUMENTS

| | | | |
|---|---|---|---|
| 2010/0126281 A1* | 5/2010 | Cosentino | B64C 1/12 |
| | | | 73/802 |
| 2011/0046821 A1* | 2/2011 | Grabowsky | B64C 3/56 |
| | | | 701/3 |
| 2012/0132748 A1 | 5/2012 | Axford | |
| 2013/0099063 A1* | 4/2013 | Grip | B64D 27/24 |
| | | | 244/219 |
| 2015/0041004 A1* | 2/2015 | Komoda | B64D 37/04 |
| | | | 137/565.01 |
| 2016/0107743 A1* | 4/2016 | Seack | B64C 1/10 |
| | | | 244/119 |
| 2016/0318597 A1* | 11/2016 | Kent | B64C 3/18 |
| 2016/0332392 A1* | 11/2016 | Price | B32B 3/04 |
| 2017/0174313 A1* | 6/2017 | Brakes | B64F 5/10 |
| 2017/0259904 A1* | 9/2017 | Kooiman | B64C 3/26 |
| 2017/0259905 A1* | 9/2017 | Kooiman | B29D 99/0021 |

OTHER PUBLICATIONS

European Search Report; Application No. EP 17193602.4; European Patent Office; dated May 4, 2018.

* cited by examiner

TILTROTOR AIRCRAFT WINGS HAVING BUCKLE ZONES

TECHNICAL FIELD OF THE DISCLOSURE

The present disclosure relates, in general, to tiltrotor aircraft having a forward flight mode and a vertical takeoff and landing flight mode and, in particular, to a tiltrotor aircraft wing having buckle zones enabling preferential collapse of the wing at desired locations in the event of a tiltrotor aircraft crash to protect the fuselage and any passengers therein from being crushed by the wing.

BACKGROUND

Tiltrotor aircraft typically include multiple propulsion assemblies that are positioned near the outboard ends of a wing. Each propulsion assembly may include an engine and transmission that provide torque and rotational energy to a drive shaft that rotates a proprotor assembly including a hub assembly and a plurality of proprotor blades. Typically, a pylon assembly, which includes the proprotor assembly, is rotatable relative to the wing such that the proprotor blades have a generally horizontal plane of rotation providing vertical lift for takeoff, hovering and landing, much like a conventional helicopter, and a generally vertical plane of rotation providing forward thrust for cruising in forward flight with the wing providing lift, much like a conventional propeller driven airplane. In addition, tiltrotor aircraft can be operated in configurations between the helicopter flight mode and the airplane flight mode, which may be referred to as conversion flight mode.

The propulsion assemblies of tiltrotor aircraft tend to be quite large and heavy. Accordingly, tiltrotor aircraft wings must be designed with sufficient stiffness to support the weight of the propulsion assemblies as well as withstand the forces generated by the proprotor assemblies and provide a lifting force sufficient to lift the tiltrotor aircraft during forward flight. In the event of a crash, due to the location of the wing over the fuselage, the downward inertia of the wing and propulsion assemblies has the potential to crush the fuselage and any passengers therein. If the fuselage includes any structurally compromising features underneath the wing, such as a door, then the fuselage may be even more at risk of being crushed by the wing. Accordingly, a need has arisen for an improved tiltrotor aircraft design that protects the fuselage and any passengers therein from being crushed by the wing in the event of a crash.

SUMMARY

In a first aspect, the present disclosure is directed to a wing airframe for a wing of a tiltrotor aircraft. The tiltrotor aircraft includes a fuselage underneath the wing. The wing airframe includes a wing airframe core assembly and a wing skin assembly disposed on the wing airframe core assembly. The wing skin assembly includes a lower wing skin assembly disposed on the bottom side of the wing airframe core assembly. The lower wing skin assembly has one or more buckle zones outboard of the fuselage. The buckle zones are locally susceptible to buckling in response to an impact of the tiltrotor aircraft, thereby protecting the fuselage from being crushed by the wing.

In some embodiments, the wing airframe core assembly may include a plurality of ribs spaced spanwise along the wing to form a plurality of bays therebetween. The bays may include a pair of first outboard bays proximate the fuselage, each of the buckle zones located at one of the first outboard bays. In certain embodiments, the bays may include one or more midwing bays above the fuselage, and the first outboard bays may be fuel carrying bays while the midwing bays may be non-fuel carrying bays. In some embodiments, the lower wing skin assembly may form a plurality of access holes including a pair of first outboard access holes located proximate the fuselage, and each of the buckle zones may include one of the first outboard access holes. In certain embodiments, one of the first outboard access holes may be proximate the left side of the fuselage and the other of the first outboard access holes may be proximate the right side of the fuselage. In some embodiments, the access holes may include one or more midwing access holes located above the fuselage, and the midwing access holes may be smaller than the first outboard access holes to facilitate buckling of the wing outboard of the fuselage in response to the impact. In certain embodiments, the access holes may include a plurality of fuel access holes. In some embodiments, the buckle zones may include one or more structural discontinuities of the lower wing skin assembly.

In certain embodiments, the wing may include a midwing section located above the fuselage and the wing skin assembly may be thickened at the midwing section of the wing to enable the wing to buckle outboard of the midwing section in response to the impact. In some embodiments, the wing skin assembly may include an inner skin, a cell core and an outer skin and the thickened wing skin assembly at the midwing section of the wing may include a thickened inner skin. In certain embodiments, the thickened wing skin assembly at the midwing section of the wing may include a lower thickened wing skin assembly disposed on the bottom side of the wing airframe core assembly and an upper thickened wing skin assembly disposed on the top side of the wing airframe core assembly. In some embodiments, the wing may include left and right outboard sections, the midwing section interposed between the left and right outboard sections. In such embodiments, the wing skin assembly may include a left outboard core stiffened wing skin assembly, a midwing core stiffened wing skin assembly and a right outboard core stiffened wing skin assembly respectively located at the left outboard section, the midwing section and the right outboard section of the wing. The midwing core stiffened wing skin assembly may be thicker than the left and right outboard core stiffened wing skin assemblies. In certain embodiments, the wing skin assembly may including a core stiffened wing skin assembly having an inner skin, an outer skin and a cell core sandwiched between the inner and outer skins. In some embodiments, the cell core may include an array of cells having interconnected cell walls. In certain embodiments, the cell core may include a honeycomb structure.

In a second aspect, the present disclosure is directed to a tiltrotor aircraft including a fuselage and a wing disposed atop the fuselage. The wing has a wing airframe including a wing airframe core assembly and a wing skin assembly disposed on the wing airframe core assembly. The wing skin assembly includes a lower wing skin assembly disposed on the bottom side of the wing airframe core assembly. The lower wing skin assembly has one or more buckle zones outboard of the fuselage. The buckle zones are locally susceptible to buckling in response to an impact of the tiltrotor aircraft, thereby protecting the fuselage from being crushed by the wing.

In some embodiments, the wing may have a downward inertia in response to the impact, causing a compression force on the lower wing skin assembly. The compression force may cause the lower wing skin assembly to buckle at the buckle zones in response to the impact. In certain embodiments, the wing may include first and second outboard ends respectively having first and second propulsion assemblies coupled thereto, and the wing and the propulsion assemblies may have the downward inertia that causes the compression force on the lower wing skin assembly in response to the impact. In some embodiments, the wing skin assembly may be thickest toward the centerline of the wing and thinnest toward the outboard ends of the wing. In certain embodiments, the wing may include a midwing section above the fuselage and left and right outboard sections, the midwing section interposed between the left and right outboard sections. In such embodiments, the midwing section may have a first failure load, the left and right outboard sections may have a second failure load and the first failure load may be at least 10 percent higher than the second failure load.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including moving and/or non-moving mechanical connections.

Figure 1A:
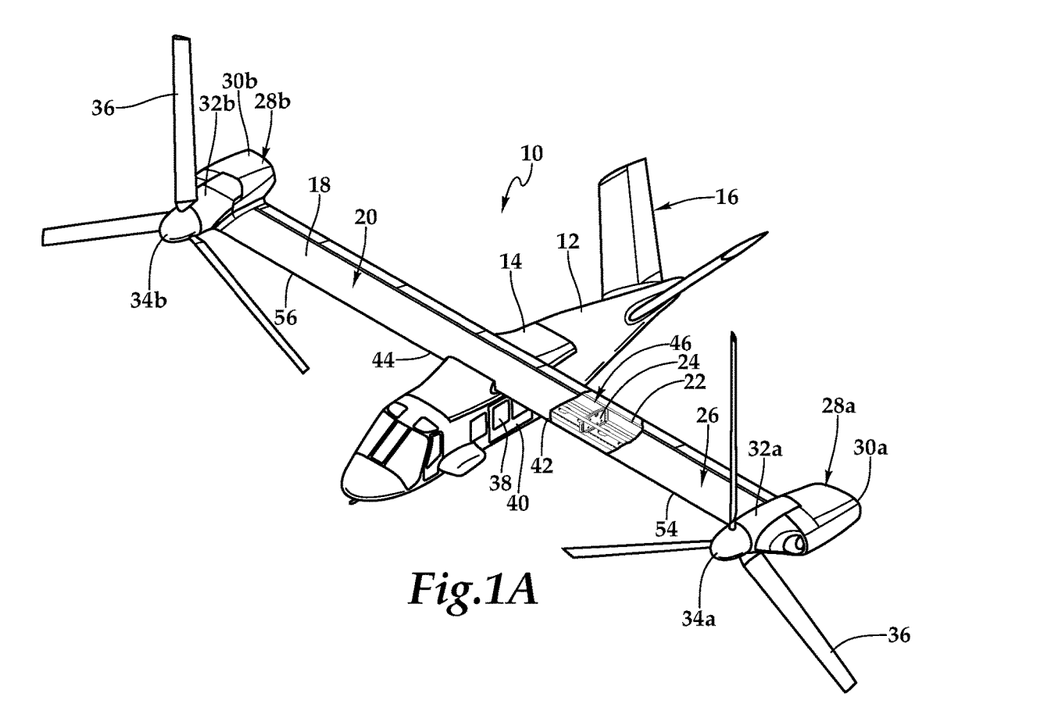
FIGS. 1A-1C are schematic illustrations of a tiltrotor aircraft including a wing with buckle zones in accordance with embodiments of the present disclosure.
Figure 1B:
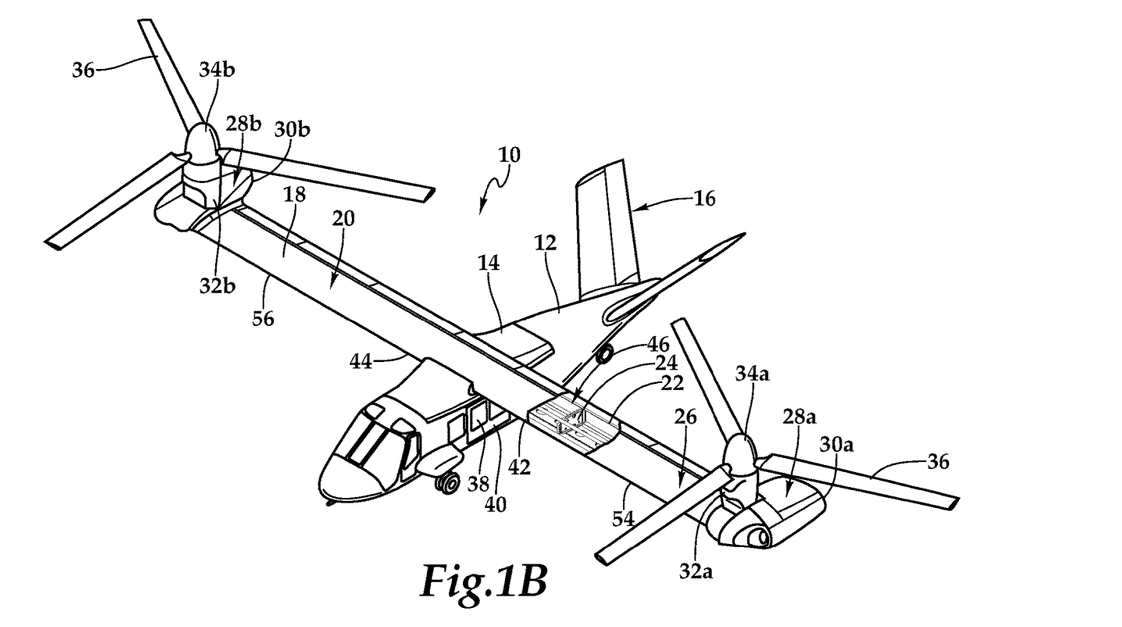
Figure 1C:
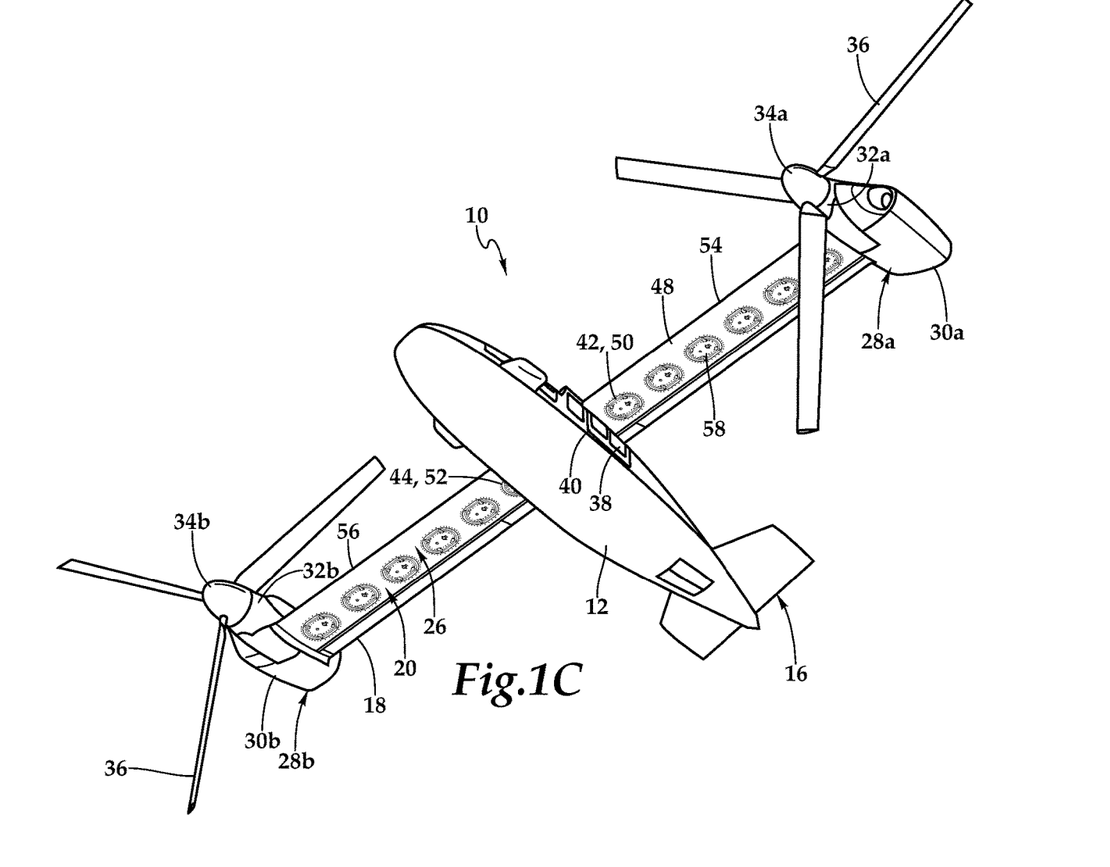

Referring to FIGS. 1A-1C of the drawings, a tiltrotor aircraft is schematically illustrated and generally designated 10. Tiltrotor aircraft 10 includes a fuselage 12, a wing mount assembly 14 that may be rotatable relative to fuselage 12 and a tail assembly 16 having control surfaces operable for horizontal and/or vertical stabilization during forward flight. A wing 18 is supported atop fuselage 12 by wing mount assembly 14. In embodiments having a rotatable wing mount assembly 14, wing 18 rotates therewith relative to fuselage 12 to enable tiltrotor aircraft 10 to convert to a storage configuration. Together, fuselage 12, tail assembly 16 and wing 18 as well as their various frames, supports, longerons, stringers, bulkheads, spars, ribs and skins may be considered to be the airframe of tiltrotor aircraft 10. The airframe of tiltrotor aircraft 10 includes a wing airframe 20 that includes wing spars 22, wing ribs 24, core stiffened wing skin assembly 26 and other structurally supportive members of wing 18. Wing spars 22, wing ribs 24 and core stiffened wing skin assembly 26 form a torque box structure configured to distribute loads, shears and other motions or forces in various flight modes.

Coupled to the outboard ends of wing 18 are propulsion assemblies 28a, 28b. Propulsion assemblies 28a, 28b include fixed nacelles 30a, 30b, respectively, each of which preferably houses an engine and a fixed portion of a drive system. A pylon assembly 32a is rotatable relative to fixed nacelle 30a and wing 18 between a generally horizontal orientation, as best seen in FIG. 1A, and a generally vertical orientation, as best seen in FIG. 1B. Pylon assembly 32a includes a rotatable portion of the drive system and a proprotor assembly 34a that is rotatable responsive to torque and rotational energy provided via the engine and drive system. Likewise, a pylon assembly 32b is rotatable relative to fixed nacelle 30b and wing 18 between a generally horizontal orientation, as best seen in FIG. 1A, and a generally vertical orientation, as best seen in FIG. 1B. Pylon assembly 32b includes a rotatable portion of the drive system and a proprotor assembly 34b that is rotatable responsive to torque and rotational energy provided via the engine and drive system. In the illustrated embodiment, proprotor assemblies 34a, 34b each include three proprotor blade assemblies 36. It should be understood by those having ordinary skill in the art, however, that proprotor assemblies 34a, 34b could alternatively have a different number of proprotor blades, either less than or greater than three. In addition, it should be understood that the position of pylon assemblies 32a, 32b, the angular velocity or revolutions per minute (RPM) of proprotor assemblies 34a, 34b, the pitch of proprotor blades 36 and the like are controlled by the pilot of tiltrotor aircraft 10 and/or the flight control system to selectively control the direction, thrust and lift of tiltrotor aircraft 10 during flight.

FIG. 1A illustrates tiltrotor aircraft 10 in a forward flight mode or airplane flight mode, in which proprotor assemblies 34a, 34b are positioned to rotate in a substantially vertical plane to provide a forward thrust while a lifting force is supplied by wing 18 such that tiltrotor aircraft 10 flies much like a conventional propeller driven aircraft. FIG. 1B illustrates tiltrotor aircraft 10 in a vertical takeoff and landing (VTOL) flight mode or helicopter flight mode, in which proprotor assemblies 34a, 34b are positioned to rotate in a substantially horizontal plane to provide a vertical thrust such that tiltrotor aircraft 10 flies much like a conventional helicopter. During operation, tiltrotor aircraft 10 may convert from helicopter flight mode to airplane flight mode following vertical takeoff and/or hover. Likewise, tiltrotor aircraft 10 may convert back to helicopter flight mode from airplane flight mode for hover and/or vertical landing. In addition, tiltrotor aircraft 10 can perform certain flight maneuvers with proprotor assemblies 34a, 34b positioned between airplane flight mode and helicopter flight mode, which can be referred to as conversion flight mode.

Preferably, each fixed nacelle 30a, 30b houses a drive system, such as an engine and transmission, for supplying torque and rotational energy to a respective proprotor assembly 34a, 34b. In such embodiments, the drive systems of each fixed nacelle 30a, 30b may be coupled together via one or more drive shafts located in wing 18 such that either drive system can serve as a backup to the other drive system in the event of a failure. Alternatively or additionally, fuselage 12 may include a drive system, such as an engine and transmission, for providing torque and rotational energy to each proprotor assembly 34a, 34b via one or more drive shafts located in wing 18. In tiltrotor aircraft having both nacelle and fuselage mounted drive systems, the fuselage mounted drive system may serve as a backup drive system in the event of failure of either or both of the nacelle mounted drive systems.

Wing 18, under which fuselage 12 is disposed, supports propulsion assemblies 28a, 28b, which tend to be large and heavy. In the event of an impact, or crash, of tiltrotor aircraft 10, wing 18 and propulsion assemblies 28a, 28b may have a downward inertia with the potential to crush fuselage 12, including fuselage cabin 38 and any passengers therein. Natural weak points in fuselage 12 underneath wing 18, such as fuselage door 40, may increase the likelihood of fuselage 12 being crushed by wing 18 during an impact. Tiltrotor aircraft 10 includes safety features wherein wing 18 has design locations that are locally susceptible to buckling such that wing 18 tends to collapse in a desired manner at predetermined buckle zones 42, 44 to reduce the downward force of wing 18 and propulsion assemblies 28a, 28b on fuselage 12 in a downward impact.

In the illustrative embodiments, wing airframe 20 includes a wing airframe core assembly 46, which includes wing spars 22 and wing ribs 24 and on which core stiffened wing skin assembly 26 is disposed. Core stiffened wing skin assembly 26 may include cell core stiffening panels. Core stiffened wing skin assembly 26 includes lower core stiffened wing skin assembly 48 disposed on the bottom side of wing airframe core assembly 46. Lower core stiffened wing skin assembly 48 forms buckle zones 42, 44 outboard of but proximate fuselage 12. In the illustrated embodiment, buckle zones 42, 44 include the first outboard fuel access holes 50, 52 on the left and right outboard sections 54, 56 of wing 18, respectively. As used herein, including in the claims, the terms "left" and "right," unless otherwise indicated, refer to the port and starboard sides of an aircraft, respectively. The fuel access holes formed by lower core stiffened wing skin assembly 48, including fuel access holes 50, 52, are covered by fuel access panels 58. Buckle zones 42, 44, which include first outboard fuel access holes 50, 52 on left and right outboard sections 54, 56 of wing 18, are locally susceptible to buckling when tiltrotor aircraft 10 is subjected to an impact or crash load, thereby reducing the downward force of wing 18 and propulsion assemblies 28a, 28b upon fuselage 12 and protecting fuselage 12 from being crushed by wing 18.

It should be appreciated that tiltrotor aircraft 10 is merely illustrative of a variety of aircraft that can implement the embodiments disclosed herein. Indeed, buckle zones 42, 44 may be utilized on any aircraft having one or more wings. Other aircraft implementations can include hybrid aircraft, tiltwing aircraft, quad tiltrotor aircraft, unmanned aircraft, gyrocopters, airplanes, jets and the like. As such, those of ordinary skill in the art will recognize that buckle zones 42, 44 can be integrated into a variety of aircraft configurations. Although buckle zones 42, 44 are illustrated as being implemented on a unitary wing that spans both sides of fuselage 12, buckle zones 42, 44 may be utilized on two or more structurally separate or semi-separate wings of the same aircraft. It should be appreciated that even though aircraft are particularly well-suited to implement the embodiments of the present disclosure, non-aircraft vehicles and devices can also implement the embodiments, including, but not limited to, automobiles or land-based vehicles.

Figure 2:
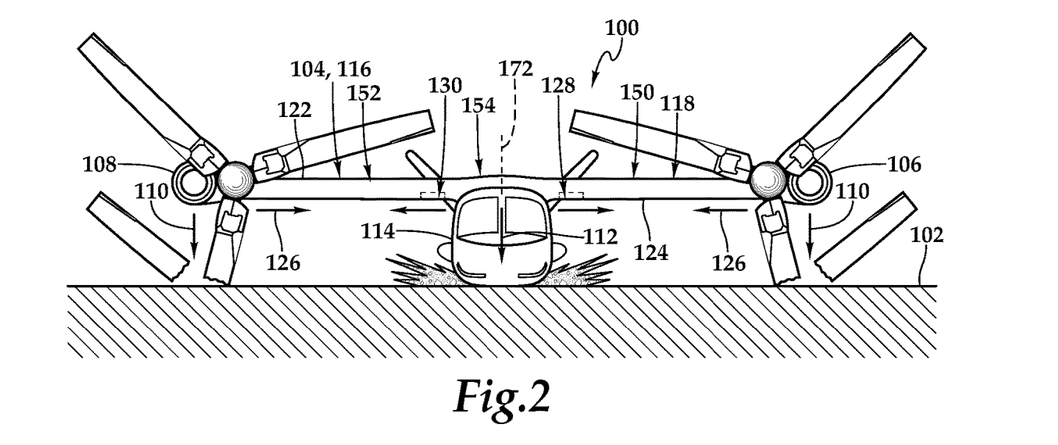
FIG. 2 is a front view of a tiltrotor aircraft colliding with the ground in accordance with embodiments of the present disclosure.

Referring to FIGS. 2, 3A-3C, 4 and 5A-5B of the drawings, a tiltrotor aircraft having a wing with buckle zones is schematically illustrated and generally designated 100. FIG. 2 illustrates a downward collision between tiltrotor aircraft 100 and ground 102, which is a type of impact in which the illustrative embodiments may be implemented. When tiltrotor aircraft 100 collides with ground 102, wing 104 and propulsion assemblies 106, 108 have a downward inertia 110 that exerts a downward force 112 on fuselage 114. Downward force 112 may, in some circumstances, have the potential to crush fuselage 114, including any passengers therein.

Figure 3A:
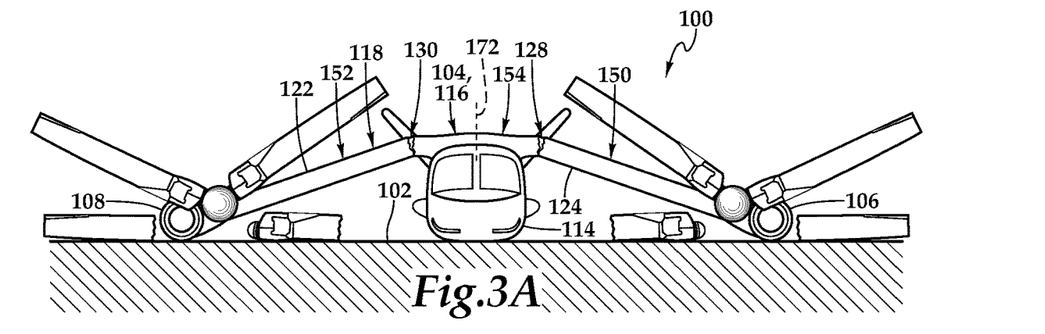
FIGS. 3A-3C are various views of a tiltrotor aircraft having a buckled wing after an impact in accordance with embodiments of the present disclosure.
Figure 3B:
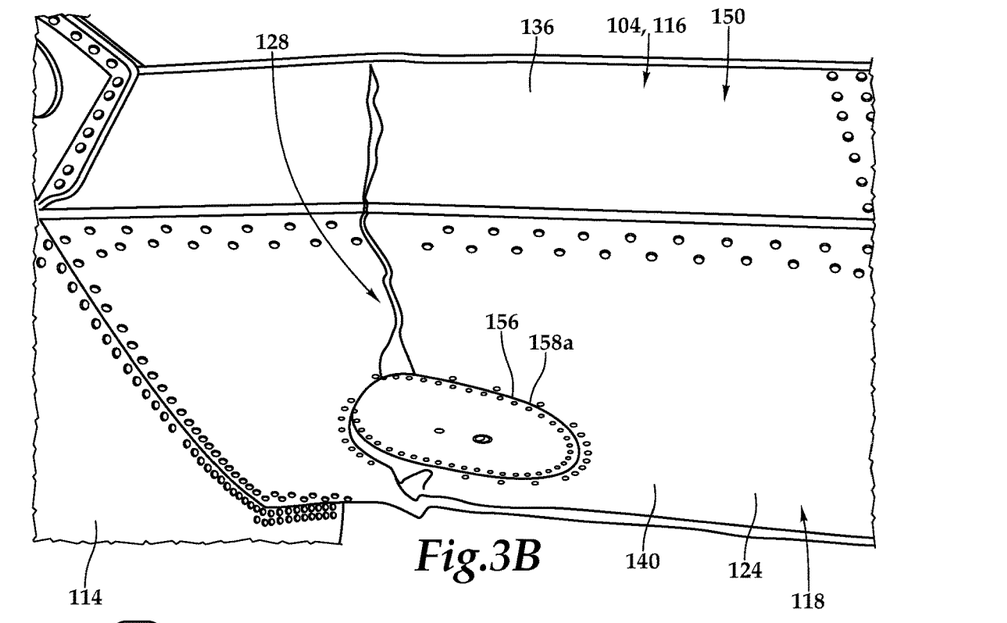
Figure 3C:
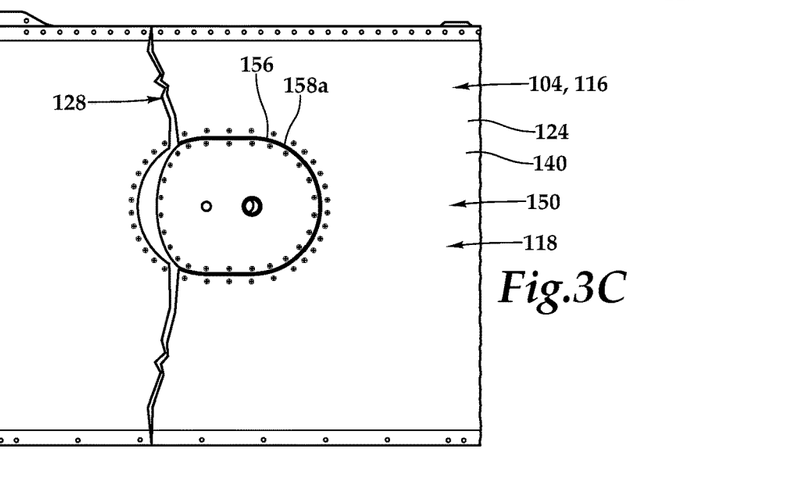

Wing 104 is supported by wing airframe 116, which includes core stiffened wing skin assembly 118 disposed on wing airframe core assembly 120. Core stiffened wing skin assembly 118 includes an upper core stiffened wing skin assembly 122 disposed on the top side of wing airframe core assembly 120 and a lower core stiffened wing skin assembly 124 disposed on the bottom side of wing airframe core assembly 120. Downward inertia 110 of propulsion assemblies 106, 108 and wing 104 causes a compression force 126 on lower core stiffened wing skin assembly 124, which causes lower core stiffened wing skin assembly 124 to buckle at buckle zones 128, 130 in response to the impact between tiltrotor aircraft 100 and ground 102, as best seen in FIGS. 3A-3C. Thus, when tiltrotor aircraft 100 is in failure mode, wing 104 buckles at desired locations to allow propulsion assemblies 106, 108 to move toward, or collide with, ground 102 to reduce downward force 112 on fuselage 114, thereby protecting fuselage 114 from being crushed or severely damaged by wing 104.

Figures 4, 5A, 5B:
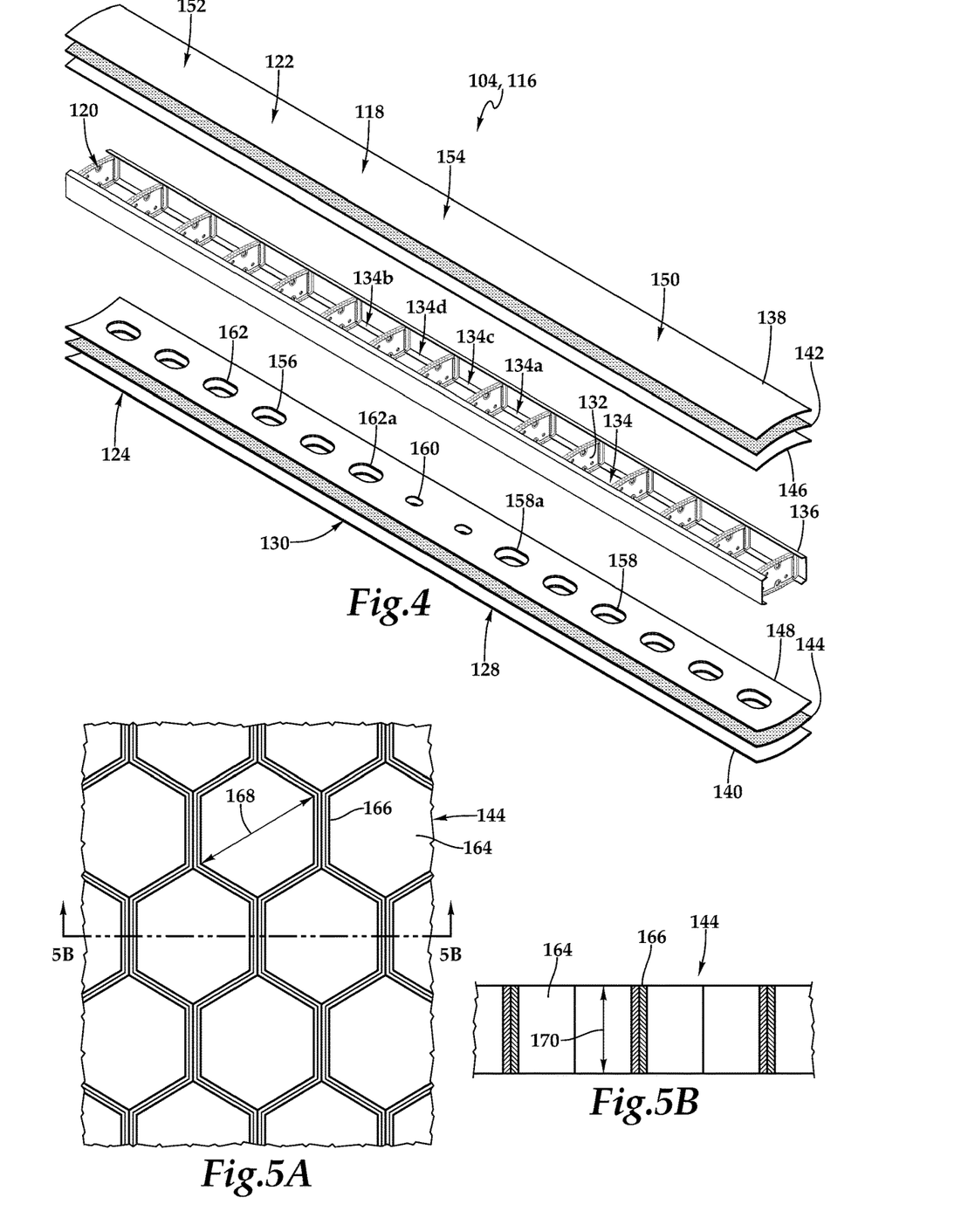
FIG. 4 is an exploded view of a tiltrotor aircraft wing in accordance with embodiments of the present disclosure.
FIGS. 5A-5B are various views of a cell core of a core stiffened wing skin assembly in accordance with embodiments of the present disclosure.
Figure 6:
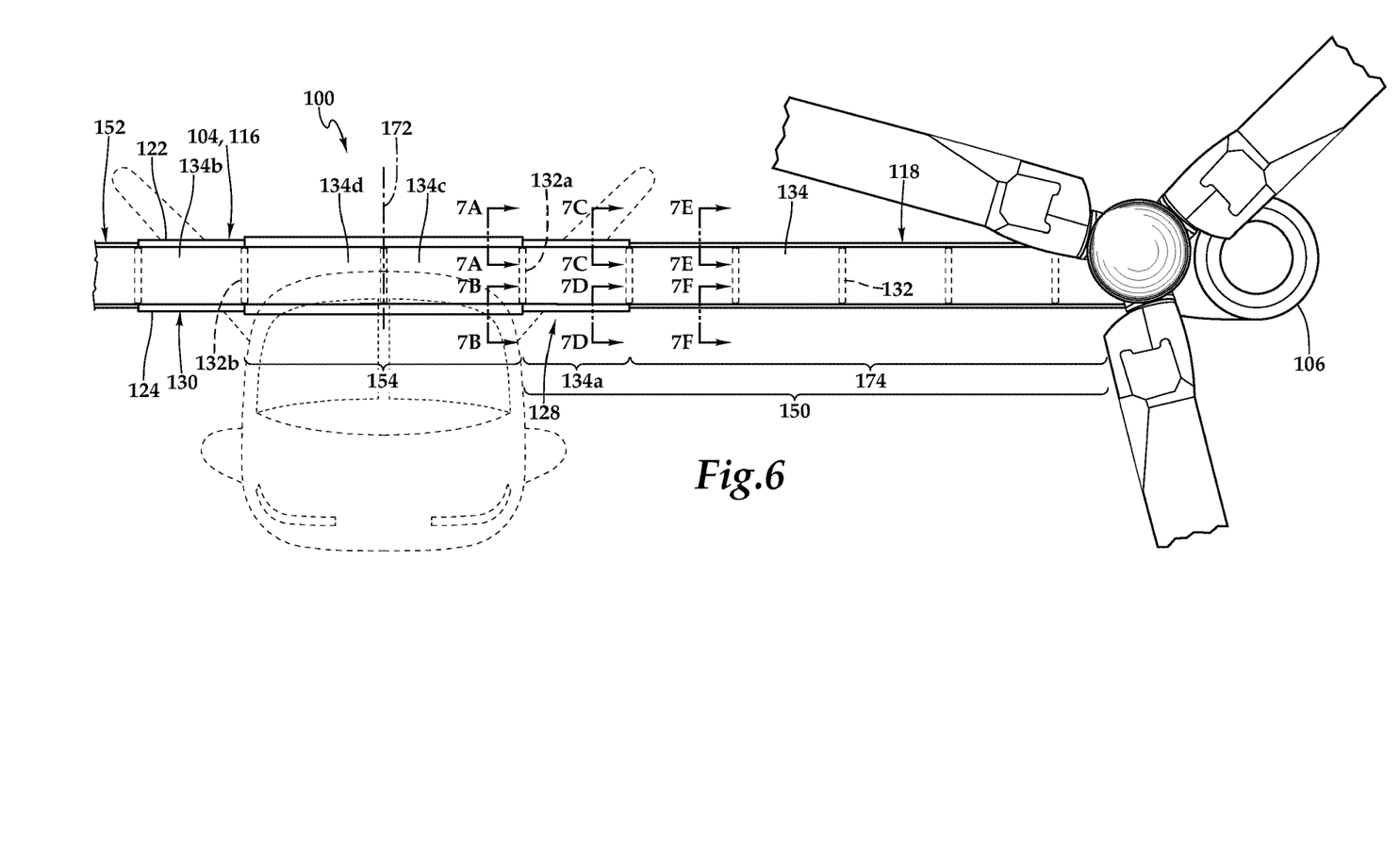
FIG. 6 is a front view of a tiltrotor aircraft wing including a core stiffened wing skin assembly with varying thicknesses in accordance with embodiments of the present disclosure.
Figure 7A:
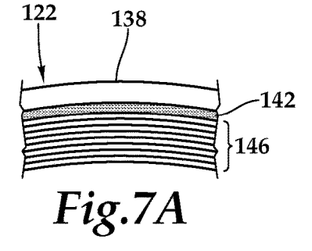
FIGS. 7A-7F are cross sectional views of a core stiffened wing skin assembly at various points along the tiltrotor aircraft wing in accordance with embodiments of the present disclosure.
Figure 7B:
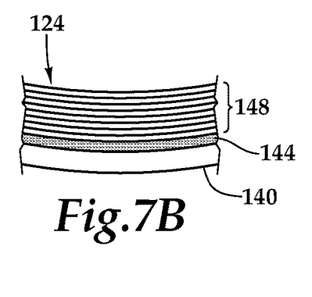
Figure 7C:
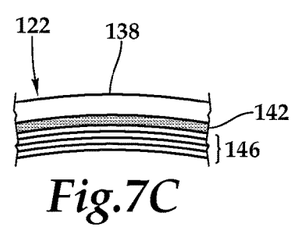
Figure 7D:
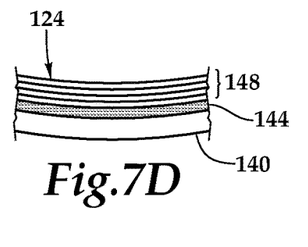
Figure 7E:
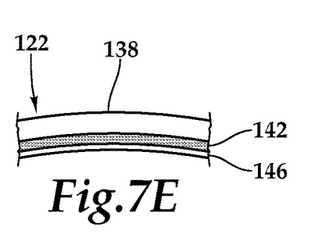
Figure 7F:
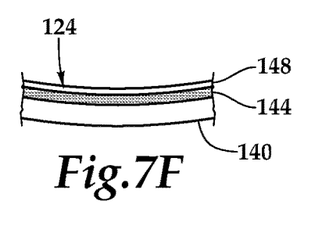

As best seen in FIG. 4, wing airframe core assembly 120 of wing airframe 116 includes ribs 132 that are spaced spanwise along wing 104 to form bays 134 therebetween. Wing airframe core assembly 120 also includes spars 136. Upper and lower core stiffened wing skin assemblies 122, 124 include outer skins 138, 140, cell cores 142, 144 and inner skins 146, 148, respectively. Cell core 142 is sandwiched between outer and inner skins 138, 146 of upper core stiffened wing skin assembly 122 and cell core 144 is sandwiched between outer and inner skins 140, 148 of lower core stiffened wing skin assembly 124. Wing 104 includes a left outboard section 150, a right outboard section 152 and a midwing section 154. Midwing section 154 is located above fuselage 114 and is interposed between left and right outboard sections 150, 152. Left and right outboard sections 150, 152 are outboard of fuselage 114.

Lower core stiffened wing skin assembly 124 forms access holes 156 spaced spanwise across wing 104. Access holes 156 may be fuel access holes through which fuel in bays 134 is accessed. Lower core stiffened wing skin assembly 124 forms left access holes 158, midwing access holes 160 and right access holes 162 at left outboard section 150, midwing section 154 and right outboard section 152 of wing 104, respectively. Buckle zone 128 includes inboard-most access hole 158a of left access holes 158, which is outboard of and proximate the left side of fuselage 114. Buckle zone 130 includes inboard-most access hole 162a of right access holes 162, which is outboard of and proximate the right side of fuselage 114. While wing 104 must support the weight of propulsion assemblies 106, 108, withstand the forces generated from propulsion assemblies 106, 108 in a variety of modes and provide a lifting force sufficient to lift tiltrotor aircraft 100, access holes 156, and in particular inboard-most access holes 158a, 162a, provide discrete and predictable weak points to act as failure locations when wing 104 is subjected to a crash load. While any of left or right access holes 158, 162 may be buckle zones designed to fail upon impact, inboard-most access holes 158a, 162a of left and right access holes 158, 162, respectively, may be particularly suitable for inclusion in buckle zones 128, 130 due to the high moment experienced by wing 104 just outboard of fuselage 114. Inboard-most access holes 158a, 162a are located at, and provide access to, the first outboard bays 134a, 134b of wing 104 that are outboard of fuselage 114. Of the bays in left and right outboard sections 150, 152 of wing 104, first outboard bays 134a, 134b are the inboard-most and therefore closest to fuselage 114 and may be referred to herein as being proximate fuselage 114. As best seen in FIGS. 3B and 3C, buckle zones 128, 130 may include areas adjacent to access holes 158a, 162a, including surrounding portions of lower core stiffened wing skin assembly 124 and/or spars 136. It will be appreciated by one of ordinary skill in the art that although left and right outboard sections 150, 152 of wing 104 are illustrated as respectably having six access holes and six bays, left and right outboard sections 150, 152 may include any suitable number of access holes or bays.

Upper core stiffened wing skin assembly 122, lower core stiffened wing skin assembly 124, ribs 132 and spars 136 are coupled to one another to form a torque box structure, which may be joined together by adhesive bonding or using aerospace fasteners such as pins, screws, rivets or other suitable fastening techniques to form the torque box structure. Various structural components of wing airframe 116 such as outer skins 138, 140, inner skins 146, 148, spars 136, ribs 132 and the like may be formed from composite materials that may include numerous material plies composed of continuous filaments or fibers including one or more of glass, carbon, graphite, basalt, aromatic polyamide materials or the like and any combination thereof. The material plies may be in the form of fabrics such as woven fabrics, tape such as unidirectional tape and the like. The plies may be joined together with a resin such as a polymeric matrix including thermoplastic or thermosetting resin or any suitable resin system.

Cell cores 142 and 144 are interposed between outer and inner skins 138 and 146, 140 and 148, respectively, to provide structural stiffness for outer and inner skins 138, 140, 146, 148, which can prevent outer and inner skins 138, 140, 146, 148 from buckling during normal operation. It is noted that the use of cell cores 142, 144 to form upper and lower core stiffened wing skin assemblies 122, 124 advantageously provides narrow profiles for the upper and lower core stiffened wing skin assemblies 122, 124 that do not include or require any conventional stringers, thereby providing improved fuel bay clearance. In addition, the use of cell cores 142, 144 to form upper and lower core stiffened wing skin assemblies 122, 124 improves the strength of the torque box structure including improved stiffness and torsional support during the shearing motion produced by propulsion assemblies 106, 108. Also, because lower core stiffened wing skin assembly 124 is core stiffened without requiring external stringers or stiffeners, when lower core stiffened wing skin assembly 124 buckles under a crash load there may be no alternate load paths to take compressive load 126, which facilitates the design collapse of wing 104 at buckle zones 128, 130 in failure mode.

As best seen in FIGS. 5A and 5B, cell core 144 may include an array of cells 164 having interconnected cell walls 166. Cell core 144 is substantially similar to cell core 142 therefore, for sake of efficiency, certain features will be disclosed only with regard to cell core 144. One having ordinary skill in the art, however, will fully appreciate an understanding of cell core 142 based upon the disclosure herein of cell core 144. Cell core 144 may be in the form of large and/or honeycomb cell structures having a plurality of interconnected cell walls that define a plurality of cells. Cells 164 may take the form of hexagonal cells, rectangular cells, square cells, flex-core cells, reinforced cells or the like. Cell core 144 may be formed from a variety of materials, including but not limited to, composite materials and metals. For example, cell core 144 may be a large cell composite core such as a large cell carbon core. In the illustrated embodiment, each section of cell core 144 may be constructed of similar material, shape and size but, in other embodiments, a plurality of cell core sections or panels may include a variety of cell core sections or panels having at least one different material, shape or size as compared to the other cell core sections or panels. All or a portion of cells 164 of cell core 144 may be filled with any material to provide additional stiffening or other properties for wing 104.

In some embodiments, various features may be implemented on wing 104 so that the crash or failure load of fuselage 114 and/or midwing section 154 of wing 104 is greater than the failure load of left or right outboard sections 150, 152 of wing 104, thus helping to ensure that wing 104 buckles outboard of fuselage 114 and reducing downward force 112 on fuselage 114 in an impact. For example, the failure load of midwing section 154 or fuselage 114 may be at least 10 percent higher, such as 15 percent higher, than the failure load of left or right outboard sections 150, 152 of wing 104. In some embodiments, midwing access holes 160 located above fuselage 114 are smaller than left and right access holes 158, 162, including access holes 158a, 162a in buckle zones 128, 130, as best seen in FIG. 4. Because access holes can present natural weakened regions at which wing 104 may break, the reduced sizing of midwing access holes 160 helps facilitate buckling of wing 104 outboard of fuselage 114 in response to an impact.

Referring to FIGS. 6 and 7A-7F of the drawings, core stiffened wing skin assembly 118 may be reinforced above fuselage 114 to ensure wing failure outboard of fuselage 114 at, for example, first outboard bays 134a, 134b, upon impact. Core stiffened wing skin assembly 118 is thickened at midwing section 154 of wing 104 such that core stiffened wing skin assembly 118 is thicker at midwing section 154 than at left and right outboard sections 150, 152 of wing 104. Core stiffened wing skin assembly 118 may be thickest at centerline 172 of wing 104 and thinnest adjacent to the outboard ends of wing 104 at which propulsion assemblies 106, 108 are attached. The thickened core stiffened wing skin assembly at midwing section 154 may be substantially coextensive, spanwise, with fuselage 114, and may extend to ribs 132a, 132b located adjacent to the outboard edges of fuselage 114. In some embodiments, the thickened core stiffened wing skin assembly at midwing section 154 may extend outboard or inboard of fuselage 114. Also, core stiffened wing skin assembly 118 may be thicker at first outboard bay 134a than at remainder 174 of left outboard section 150 of wing 104. The increased thickness of core stiffened wing skin assembly 118 at first outboard bay 134a helps prevent this portion of wing 104, which typically experiences the highest moments during normal flight operations, from buckling during normal flight operations or when tiltrotor aircraft 100 is not in failure mode.

Both upper and lower core stiffened wing skin assemblies 122, 124 are thickened at midwing section 154 of wing 104. In other embodiments, only one of upper or lower core stiffened wing skin assemblies 122, 124 may be reinforced or thickened. In the illustrated embodiment, the varying thicknesses of core stiffened wing skin assembly 118 occur at inner skins 146, 148 wherein inner skins 146, 148 have a greater number of plies at midwing section 154 (see FIGS. 7A-7B) than at first outboard bay 134a (see FIGS. 7C-7D) and inner skins 146, 148 have a greater number of plies at first outboard bay 134a (see FIGS. 7C-7D) than at remainder 174 of left outboard section 150 (see FIGS. 7E-7F). The number of plies at inner skins 146, 148 may taper down in a stepwise fashion from midwing section 154 to outboard ends of wing 104. Left outboard section 150 of wing 104 is substantially similar to right outboard section 152 of wing 104 therefore, for sake of efficiency, certain features have been disclosed only with regard to left outboard section 150 of wing 104. One having ordinary skill in the art, however, will fully appreciate an understanding of right outboard section 152 based upon the disclosure herein of left outboard section 150. While the illustrated embodiment shows inner skins 146, 148 as having a varying thickness spanwise along wing 104, in other embodiments cell cores 142, 144 and/or outer skins 138, 140 may alternatively or additionally have varying thicknesses spanwise along wing 104. For example, any combination of outer skins 138, 140, cell cores 142, 144 and/or inner skins 146, 148 may be thickened or reinforced at midwing section 154 above fuselage 114 to help ensure that wing 104 buckles outboard of fuselage 114 in the event of an impact.

Figure 8:
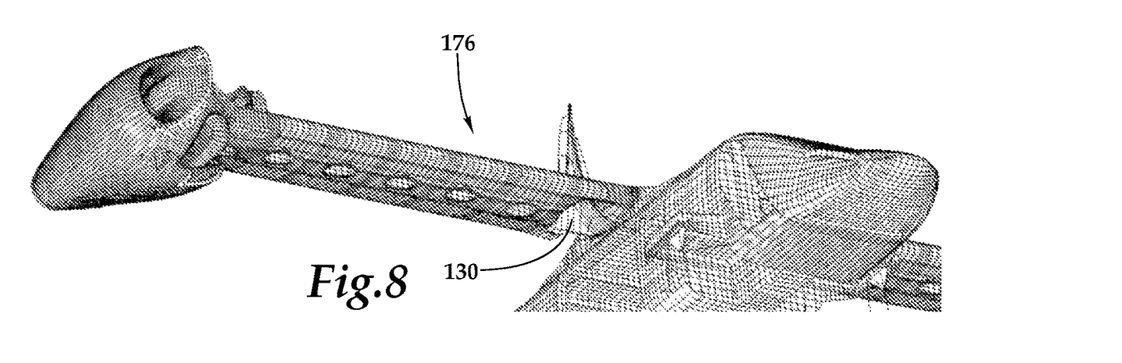
FIG. 8 is an analytical model of a tiltrotor aircraft showing a predicted buckling location and failure mode.

Referring to FIG. 8 of the drawings, an analytical model 176 of tiltrotor aircraft 100 may be used to predict or tailor the locations of buckle zones 128, 130 of tiltrotor aircraft 100 in critical failure mode. As a stronger wing may fail at a higher load, thus imposing a higher crash requirement on fuselage 114, wing 104 may be sized to have lower margins of safety and fail shortly outside of the down bending design envelope while still observing a 1.5 ultimate safety factor. Current tiltrotor aircraft require a heavier, reinforced fuselage that is subjected to the full load of the wings and propulsion assemblies in a downward collision. The illustrative embodiments allow for a lighter weight fuselage because fuselage 114 no longer is required to withstand the full applied load of wing 104 and propulsion assemblies 106, 108 in an impact, thus providing for an overall lighter weight tiltrotor aircraft while protecting fuselage 114 and any passengers therein.

Figures 9A, 9B:
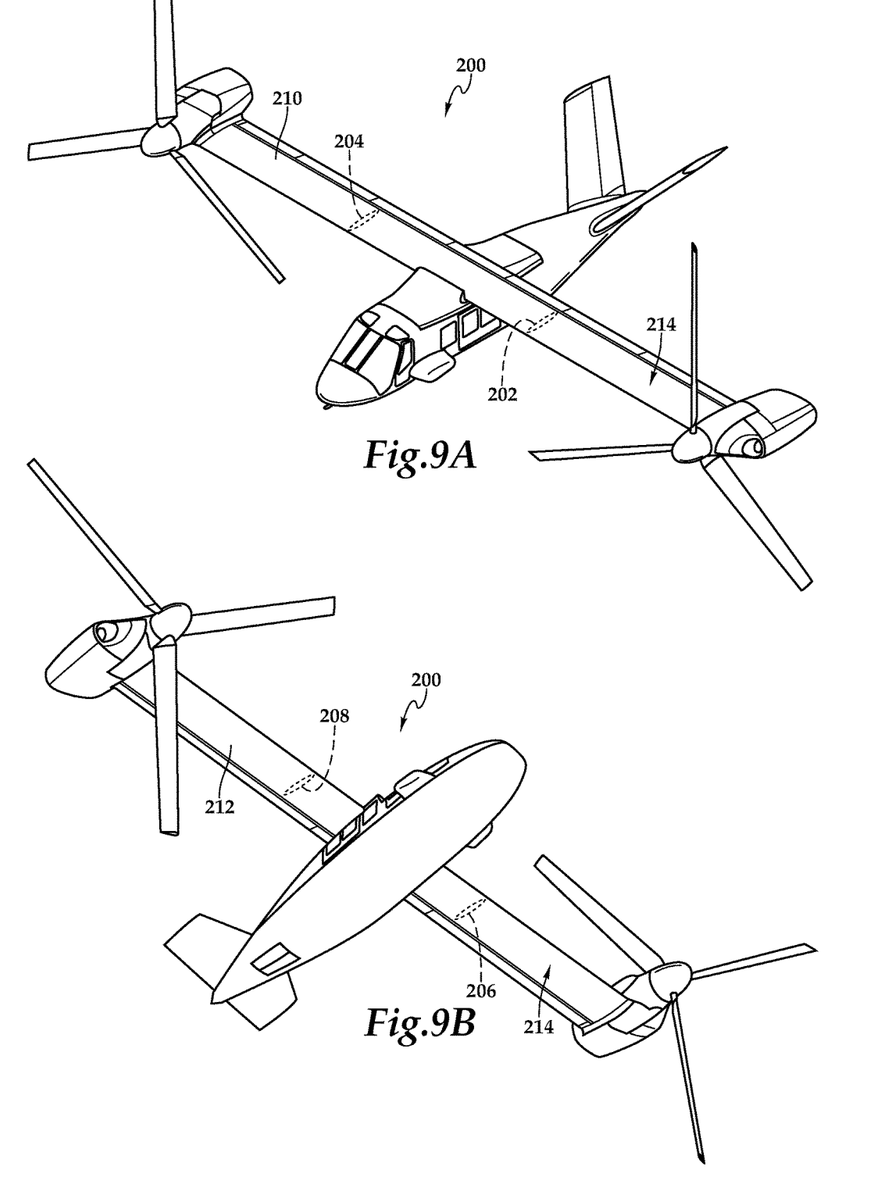
FIGS. 9A-9B are various views of a tiltrotor aircraft including a wing with buckle zones in accordance with embodiments of the present disclosure.

Referring to FIGS. 9A-9B of the drawings, a tiltrotor aircraft having a plurality of design failure zones is schematically illustrated and generally designated 200. As illustrated, design failure zones 202, 204, 206, 208 may be included on either or both of upper or lower wing skin assemblies 210, 212. Design failure zones 202, 204, 206, 208 may be located at any station or stations along the span of wing 214. In addition, design failure zones 202, 204, 206, 208 may be located at or near access holes, as described herein, and/or design failure zones 202, 204, 206, 208 may be located at or near any type of structural discontinuity such as a joint, splice, crease, perforation, pre-weakened material, gap, channel, groove, lumen, slit, transition between two panels or materials or any region that is weaker, for any reason, than its surrounding area. Design failure zones are not limited to buckle zones in the lower wing skin assembly that fail in compression. Alternatively or additionally, design failure zones may be incorporated into the upper wing skin assembly and may fail in tension rather than compression. For example, in the illustrated embodiment, design tension failure zones 202, 204 are located in upper wing skin assembly 210, 212 and design compression failure zones 206, 208 are located in lower wing skin assembly 212. Although wing 214 is shown as having four design failure zones, in other embodiments, a wing of a tiltrotor aircraft may have any number of design failure zones, such 2, 6, 8, 10 or other suitable number of design failure zones.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A wing airframe for a wing of a tiltrotor aircraft, the wing including a left outboard section, a midwing section and a right outboard section, the tiltrotor aircraft including a fuselage underneath the midwing section of the wing, the wing airframe comprising:

a wing airframe core assembly having a bottom side; and a wing skin assembly disposed on the wing airframe core assembly, the wing skin assembly including a lower wing skin assembly disposed on the bottom side of the wing airframe core assembly, the lower wing skin assembly forming a plurality of access holes including a pair of first outboard access holes located outboard of the midwing section of the wing and proximate to the fuselage to form buckle zones, each of the buckle zones further comprising one of the first outboard access holes;

wherein the pair of first outboard access holes of the lower wing skin assembly are sized such that the buckle zones have a structural failure load threshold, the buckle zones locally susceptible to buckling when an impact compression force exceeds the structural failure load threshold, thereby protecting the fuselage from being crushed by the wing;

wherein the impact compression force is caused by the downward inertia of the wing during an impact; and wherein the wing skin assembly is thickened at the midwing section of the wing to enable the wing to buckle outboard of the midwing section in response to the impact.

2. The wing airframe as recited in claim 1 wherein the wing airframe core assembly further comprises a plurality of ribs spaced spanwise along the wing to form a plurality of bays therebetween, the plurality of bays including a pair of first outboard bays proximate the fuselage, each of the first outboard access holes located at one of the first outboard bays.

3. The wing airframe as recited in claim 2 wherein the plurality of bays include one or more midwing bays above the fuselage; and wherein the first outboard bays are fuel carrying bays and the one or more midwing bays are non-fuel carrying bays.

4. The wing airframe as recited in claim 1 wherein the fuselage has a left side and a right side; and wherein one of the first outboard access holes is proximate the left side of the fuselage and the other of the first outboard access holes is proximate the right side of the fuselage.

5. The wing airframe as recited in claim 1 wherein the plurality of access holes further comprise one or more midwing access holes located above the fuselage, the one or more midwing access holes smaller than the first outboard access holes to facilitate buckling of the wing outboard of the fuselage in response to the impact.

6. The wing airframe as recited in claim 1 wherein the plurality of access holes further comprise a plurality of fuel access holes.

7. The wing airframe as recited in claim 1 wherein the buckle zones further comprise structural discontinuities of the lower wing skin assembly.

8. The wing airframe as recited in claim 1 wherein the wing skin assembly further comprises an inner skin, a cell core and an outer skin and wherein the thickened wing skin assembly at the midwing section of the wing further comprises a thickened inner skin.

9. The wing airframe as recited in claim 1 wherein the wing skin assembly further comprises a left outboard core stiffened wing skin assembly, a midwing core stiffened wing skin assembly and a right outboard core stiffened wing skin assembly respectively located at the left outboard section, the midwing section and the right outboard section of the wing; and wherein the midwing core stiffened wing skin assembly is thicker than the left and right outboard core stiffened wing skin assemblies.

10. The wing airframe as recited in claim 1 wherein the wing airframe core assembly has a top side; and wherein the thickened wing skin assembly at the midwing section of the wing further comprises a lower thickened wing skin assembly disposed on the bottom side of the wing airframe core assembly and an upper thickened wing skin assembly disposed on the top side of the wing airframe core assembly.

11. The wing airframe as recited in claim 1 wherein the wing skin assembly further comprises a core stiffened wing skin assembly including an inner skin, an outer skin and a cell core sandwiched between the inner and outer skins.

12. The wing airframe as recited in claim 11 wherein the cell core further comprises an array of cells having interconnected cell walls.

13. The wing airframe as recited in claim 11 wherein the cell core further comprises a honeycomb structure.

14. A tiltrotor aircraft comprising:

a fuselage; and a wing including a left outboard section, a midwing section and a right outboard section, the midwing section of the wing disposed atop the fuselage, the wing including a wing airframe comprising:

a wing airframe core assembly having a bottom side; and a wing skin assembly disposed on the wing airframe core assembly, the wing skin assembly including a lower wing skin assembly disposed on the bottom side of the wing airframe core assembly, the lower wing skin assembly forming a plurality of access holes including a pair of first outboard access holes located outboard of the midwing section of the wing and proximate to the fuselage to form buckle zones, each of the buckle zones further comprising one of the first outboard access holes;

wherein the pair of first outboard access holes of the lower wing skin assembly are sized such that the buckle zones have a structural failure load threshold, the buckle zones locally susceptible to buckling when an impact compression force exceeds the structural failure load threshold, thereby protecting the fuselage from being crushed by the wing;

wherein the impact compression force is caused by the downward inertia of the wing during an impact; and wherein the wing skin assembly is thickened at the midwing section of the wing to enable the wing to buckle outboard of the midwing section in response to the impact.

15. The tiltrotor aircraft as recited in claim 14 wherein the wing further comprises first and second outboard ends respectively having first and second propulsion assemblies coupled thereto and wherein the impact compression force is caused by the downward inertia of the propulsion assemblies and the wing during the impace.

16. The tiltrotor aircraft as recited in claim 14 wherein the wing has a centerline and outboard ends; and wherein the wing skin assembly is thickest toward the centerline of the wing and thinnest toward the outboard ends of the wing.

17. The tiltrotor aircraft as recited in claim 14 wherein the midwing section of the wing has a first failure load and the left and right outboard sections of the wing have a second failure load, the first failure load at least 10 percent higher than the second failure load.

18. The wing airframe as recited in claim 11 wherein the first outboard access holes traverse the cell core.

\* \* \* \* \*

UNITED STATES PATENT AND TRADEMARK OFFICE
CERTIFICATE OF CORRECTION

PATENT NO. : 10,689,091 B2
APPLICATION NO. : 15/667499
DATED : June 23, 2020
INVENTOR(S) : Baines et al.

Page 1 of 1

It is certified that error appears in the above-identified patent and that said Letters Patent is hereby corrected as shown below:

In the Claims

Column 12, Line 56, in Claim 15:
"and the wing during the impace" should read --and the wing during the impact--

Signed and Sealed this
Fourth Day of August, 2020

Andrei Iancu
*Director of the United States Patent and Trademark Office*